US011765138B2

(12) United States Patent
Cornelius et al.

(10) Patent No.: US 11,765,138 B2
(45) Date of Patent: Sep. 19, 2023

(54) USER PERSONAL INFORMATION COMMUNICATION SYSTEM AND METHOD FOR PLURALITY OF PLATFORMS

(71) Applicants: Connor Cornelius, San Diego, CA (US); Paul Hutchins, San Diego, CA (US)

(72) Inventors: Connor Cornelius, San Diego, CA (US); Paul Hutchins, San Diego, CA (US)

( * ) Notice: Subject to any disclaimer, the term of this patent is extended or adjusted under 35 U.S.C. 154(b) by 0 days.

(21) Appl. No.: 16/744,127

(22) Filed: Jan. 15, 2020

(65) Prior Publication Data

US 2021/0218715 A1 Jul. 15, 2021

(51) Int. Cl.
*H04L 9/40* (2022.01)
*H04L 9/06* (2006.01)
*G06F 21/60* (2013.01)
*H04L 9/00* (2022.01)

(52) U.S. Cl.
CPC ........ *H04L 63/0428* (2013.01); *G06F 21/602* (2013.01); *H04L 9/0637* (2013.01); *H04L 9/50* (2022.05)

(58) Field of Classification Search
None
See application file for complete search history.

(56) References Cited

U.S. PATENT DOCUMENTS

| | | | | |
|---|---|---|---|---|
| 10,693,872 B1* | 6/2020 | Larson | ................ | H04L 9/3228 |
| 10,749,681 B2* | 8/2020 | Andrade | ............... | H04L 9/0866 |
| 11,063,770 B1* | 7/2021 | Peng | ..................... | H04L 63/123 |
| 2006/0155773 A1* | 7/2006 | Drouet | ................ | G06F 21/6236 |
| 2012/0066767 A1* | 3/2012 | Vimpari | ............... | G06Q 30/016 726/26 |
| 2014/0282884 A1* | 9/2014 | Bao | ..................... | G06F 21/6263 726/4 |
| 2017/0147631 A1* | 5/2017 | Nair | ....................... | G06Q 30/06 |
| 2017/0161439 A1* | 6/2017 | Raduchel | ............... | H04W 12/06 |
| 2017/0366357 A1* | 12/2017 | Pattanaik | ........... | G06Q 20/3829 |
| 2018/0144153 A1* | 5/2018 | Pead | ..................... | G06F 21/6245 |
| 2018/0191714 A1* | 7/2018 | Jentzsch | ............... | H04L 63/126 |
| 2018/0293363 A1* | 10/2018 | Asati | ....................... | G06F 21/64 |
| 2019/0164140 A1* | 5/2019 | Pasupula | ............... | G06Q 20/065 |
| 2019/0180276 A1* | 6/2019 | Lee | ......................... | H04L 63/10 |
| 2019/0180311 A1* | 6/2019 | Chan | .................. | G06Q 30/0236 |
| 2019/0205563 A1* | 7/2019 | Gonzales, Jr. | ......... | H04L 9/0637 |
| 2019/0295162 A1* | 9/2019 | Wang | .................... | H04L 9/3247 |
| 2019/0303920 A1* | 10/2019 | Balaraman | ........... | H04L 9/0637 |
| 2020/0052899 A1* | 2/2020 | Finlow-Bates | ....... | H04L 9/3239 |
| 2020/0153793 A1* | 5/2020 | Kikinis | .................. | H04L 63/126 |
| 2020/0320222 A1* | 10/2020 | Zhou | ..................... | H04L 9/3247 |
| 2021/0266300 A1* | 8/2021 | McCaig | .................. | H04L 67/20 |

* cited by examiner

*Primary Examiner* — Kaveh Abrishamkar
(74) *Attorney, Agent, or Firm* — Merle W Richman

(57) ABSTRACT

Embodiments of architecture, systems, and methods that enable a User to maintain certain personal information across various vendors automatically are described herein. Other embodiments may be described and claimed.

18 Claims, 10 Drawing Sheets

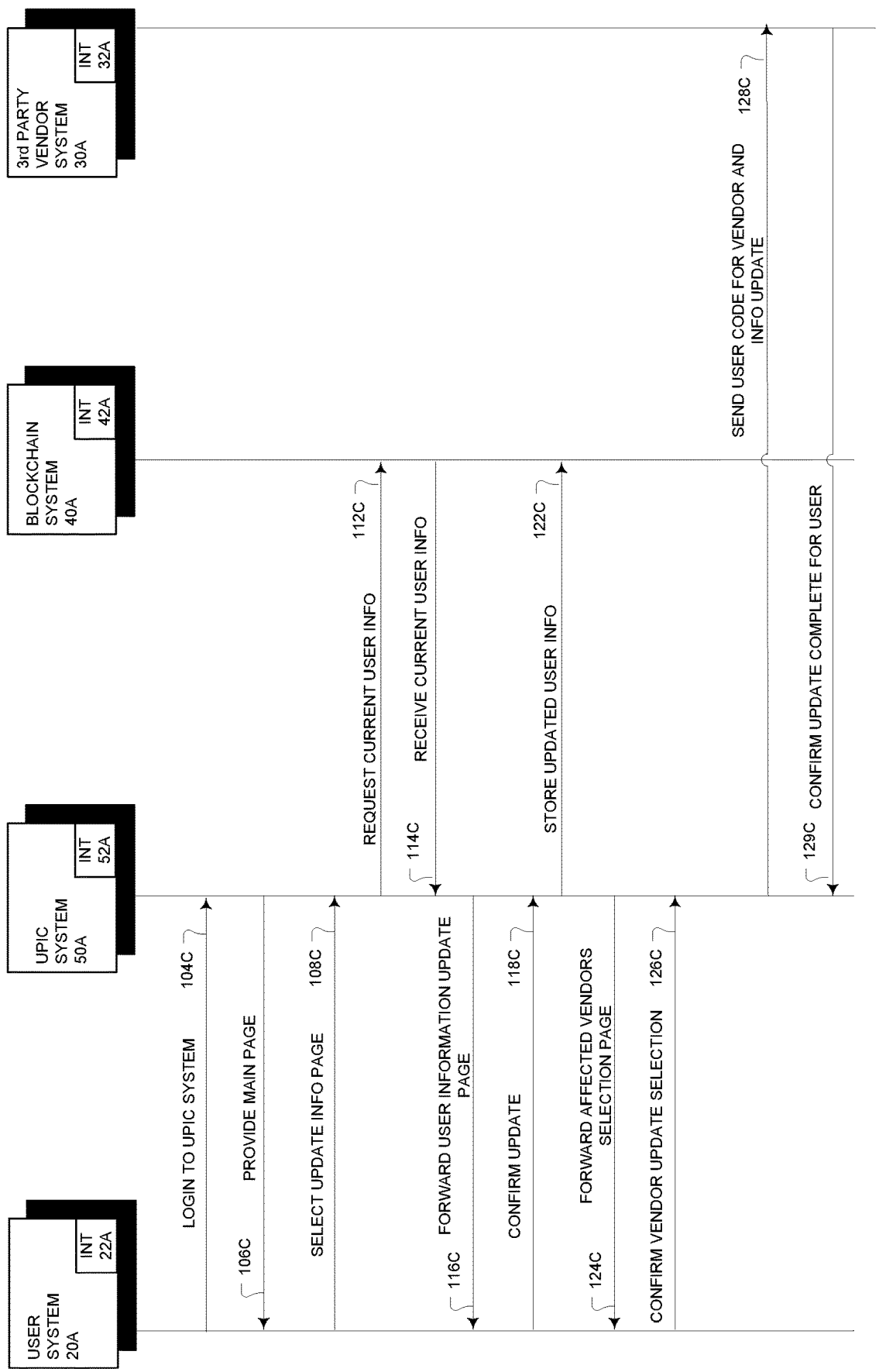

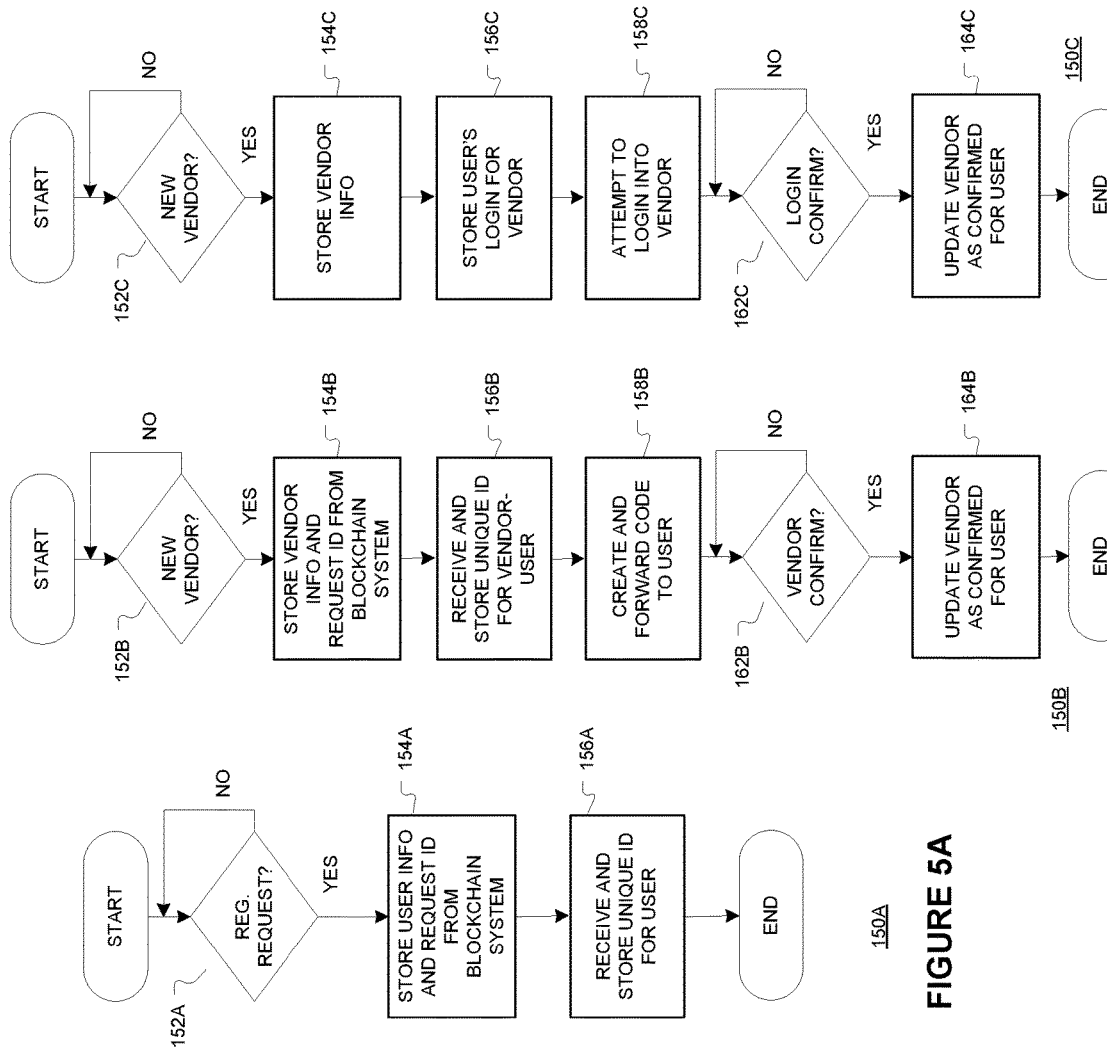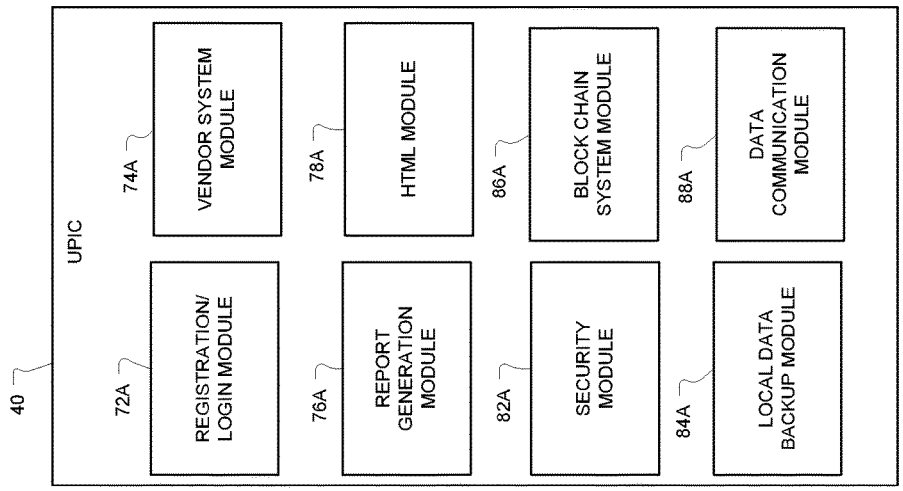

USER PERSONAL INFORMATION COMMUNICATION SYSTEM AND METHOD FOR PLURALITY OF PLATFORMS

TECHNICAL FIELD

Various embodiments described herein relate generally to architecture, systems, and methods used to communicate Users' personal information across multiple entities that have or maintain the Users' personal information.

BACKGROUND INFORMATION

Users including individuals and companies may be required to provide certain personal information to various entities where the entities may be vendors that include utility, government, educational, personal, or company vendors. If one or more attributes of User's personal information changes for various reasons, a User may need to prorogate their changed information to one or vendors via different platforms or protocols. A need exists for architecture, systems, and methods that enable a User to maintain certain personal information across various vendors automatically, the present invention provides such architecture, systems, and methods.

BRIEF DESCRIPTION OF THE DRAWINGS

FIGS. 2A-2C are diagrams of communications between a User system, a UPIC system, a blockchain system, and a $3^{rd}$ party vendor system according to various embodiments.

FIG. 4 is a block diagram of a UPIC system according to various embodiments.

FIGS. 5A-5C are flow diagrams illustrating several methods according to various embodiments.

DETAILED DESCRIPTION

As noted, Users 21 including individuals and companies may be required to provide certain personal information to various entities where the entities may be vendors that include utility, government, educational, personal, or company vendors. If one or more attributes of User's personal information changes for various reasons, a User may need to prorogate their changed information to one or vendors via different platforms or protocols. The personal information may include name, mailing address, residential address, business address, home, work, or mobile telephone number(s), personal or work E-mail address(es), websites, and government identifiers.

The entities that may require or store a User's personal information may include financial institutions such as banks (brick and mortar and online), credit card providers, brokerages, and insurance companies. The entities may further include service providers including utility (energy, water, land-lines (POTS)), digital service providers (internet and television, online video and audio (Netflix, Amazon, Ebay, Sirius), and mobile communications providers (cellular and satellite data and voice). The entities may also be employment related such as clients and employers. The entities could also be health care providers, personal, government, or work related. Other entities could include education providers, governmental agencies such as department of motor vehicles, voter registration, Federal, state, local, and other agencies. Entities may further include professional and private organizations such as religious organizations and clubs.

In order to change personal information for each entity, a User may need to at least login into each entities' website and locate the proper area to update their information. Some entities may require a telephone call with many forms of identity confirmation or written request with the new or changed information. Depending on the cause of the information change, a User may not be able to locate all the various contact information or recall the login information for the multitude of entities that store their information. Further, a User may not be aware when a entity changes information about the User, particularly if there information was out-of-date when an unauthorized request to change information was made.

Figure 1:
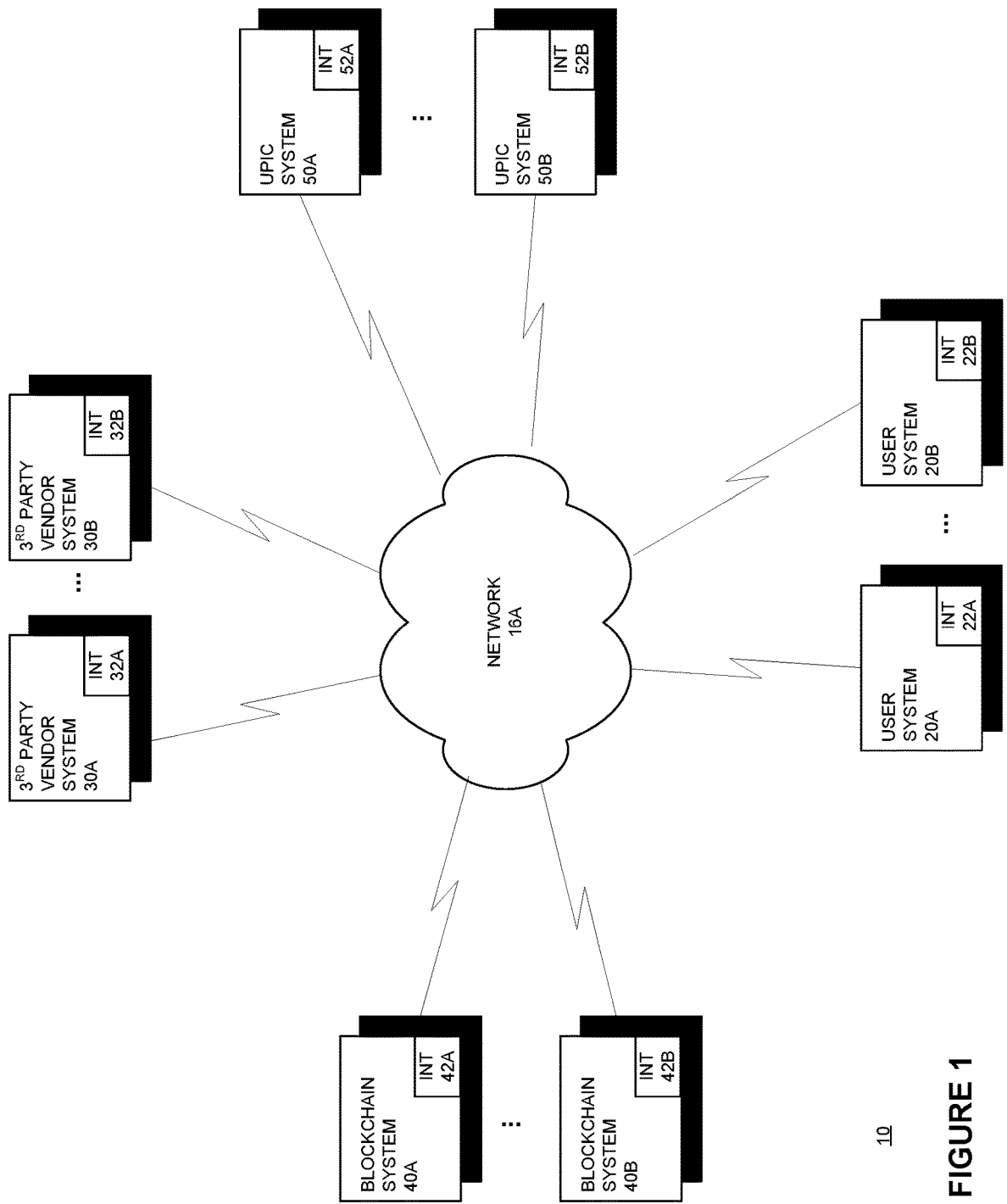
FIG. 1 is a block diagram of user personal information communication (UPIC) architecture according to various embodiments.

FIG. 1 is a block diagram of user personal information communication (UPIC) architecture 10 according to various embodiments. As shown in FIG. 1, UPIC architecture 10 may include a plurality of User systems 20A-20B, a plurality of $3^{rd}$ party vendor systems 30A-30B, one or more UPIC systems 50A-50B, and a plurality of cryptography systems 40A-40B. In an embodiment, the cryptography systems may be certificate authority entities that create or issue digital certificates. In an embodiment, the cryptography systems 40A-40B may employ cryptographically linked blocks in an open, distributed ledger termed blockchains and hereinafter systems 40A-40B are referred to as blockchain systems although they could be any cryptographic provider, system, software, or entity.

A User system 20A-20B may communicate with a UPIC system 50A-50B via one or more networks 16A where the networks may be local wired or wireless networks or a network of networks such as the Internet. A UPIC system 50A-50B may communicate with a $3^{rd}$ party vendor system 30A-30B and blockchain system 40A-40B via a network 16A. A User system may also communicate with a $3^{rd}$ party vendor system 30A-30B via a network 16A.

In an embodiment, the UPIC systems 50A-50B (hereinafter 50A for simplicity) may develop trusted relationships between a User and each of their Vendors via the Vendor systems 30A-30B (hereinafter 30A for simplicity). Then when some data of the User information changes, the UPIC 50A may communicate the changes to all or selected Vendors based on the trusted relationships. Similarly, when a Vendor system 30A receives an information change request for a User, the Vendor system 30A may communicate the changes or requests for changes to the UPIC system 50A. The UPIC system 50A may then alert the respective User 61 of the requested changes. Similarly, the UPIC 50A may additionally generate consolidated reports for selected Vendors representing account status, payment due, history, and other financial information via data provided to the UPIC system 50A from a Vendor system 30A based on the trusted relationship.

In another embodiment, a User may provide a UPIC 50A with their login to selected Vendor systems 30A. A UPIC 50A may then develop a trusted relationships between a User and each of their Vendors via the Vendor systems 30A based initially on the User login information. Then when some data of the User information changes, the UPIC 50A may communicate the changes to all or selected Vendors based on the trusted relationships. Similarly, when a Vendor system 30A receives an information change request for a User, the Vendor system 30A may communicate the changes or requests for changes to the UPIC system 50A. The UPIC system 50A may then alert the respective User 61 of the requested changes. Similarly, the UPIC 50A may additionally generate consolidated reports for selected Vendors representing account status, payment due, history, and other financial information via data provided to the UPIC system 50A from a Vendor system 30A based on the trusted relationship.

In an embodiment, a UPIC system 50A may employ one or more secure $3^{rd}$ party systems 40A-40B to create or develop trusted relationships with a Vendor system 30A. In an embodiment, the $3^{rd}$ party system 40A-40B may provide a unique ID or token for each User of the UPIC system 50A and unique IDs or tokens for each Vendor system 30A for each User, i.e., the Vendor token would be unique for each combination of User and their Vendor. The UPIC system 50A may also store all User information and updates to the information to the $3^{rd}$ party cryptography systems 40A-40B providing and storing a secure audit trail or ledger of all changes to the User data.

In an embodiment, the $3^{rd}$ party cryptography system 40A-40B (hereinafter 40A for simplicity) may employ cryptographically linked blocks in an open, distributed ledger termed blockchains in addition to digital certificates from cryptography certificate authority entities. A cryptography system 40A employing blockchains (hereinafter blockchain system 40A for simplicity) may generate digital certificates, identifiers (IDs), or tokens than are unique and tied and copied/distributed to a plurality of systems 40A to secure the digital certificates, identifiers (IDs), or tokens. Similarly, in an embodiment any updates to User information may be distributed across many systems 40A to prevent corruption of User data and provide a secure and reproducible record or ledger of all changes to User data along with the source of such changes.

In an embodiment as shown in FIGS. 3A-3D, a UPIC system 50A may include an network interface/web-server 52A where the web-server 52A may be configured to communicate messages, graphical user interfaces, and other content with a user system 20A via its network interface 22A. The interface/web-server 52A may also be configured to communicate messages and content with a blockchain system 40A via its network interface 42A and a Vendor system 30A via its network interface 32A. In an embodiment, a user system 20A may host a web browser application 28 such as Internet Explorer, Safari, Netscape, Chrome, Firefox, or Opera that may be configured to communicate messages and content with a UPIC system 50A. In an embodiment, a blockchain system 40A via its network interface 42A, a Vendor system 30A via its network interface 32A, and a User system 20A via its interface 22A may be any computer device capable of hosting an interface that can communicate with a UPIC system 50A including via web browser application 28, runtime application, application programming interface (API), or other application. A blockchain system 40A, Vendor system 30A, and a User system 20A may include an processor with a network interface 42A, 32A, 22A including a server, virtual server or system, personal computer, personal data assistant, cellular phone, or tablet computer.

In an embodiment, a UPIC system 50A may employ a web framework (WF) or web application framework (WAF) including Ruby on Rails, Java, Python, Apache, Django, or other software or architecture to provide web pages, framework, or wire frames to a User system 20A. A UPIC system 50A may also employ Software as a Service (SaaS) to provide data and executable instructions to a User system 20A and the UPIC system 50A webpages may be built using on a Rudy on Rails framework or other web frameworks. In an embodiment, a User system 20A may host an application operating natively where the application communicates data with the UPIC system 50A (such as application downloaded from an application provider or provided by the UPIC system 50A). A User system 20A may use various operating systems including Microsoft operating systems (Windows), Linux, Mac OS X, Android, WEB OS, and others to run a UPIC interface program or web browser. In an embodiment, a UPIC system 50A may provide an interface application to run natively on a User system 20A.

Figure 2A:
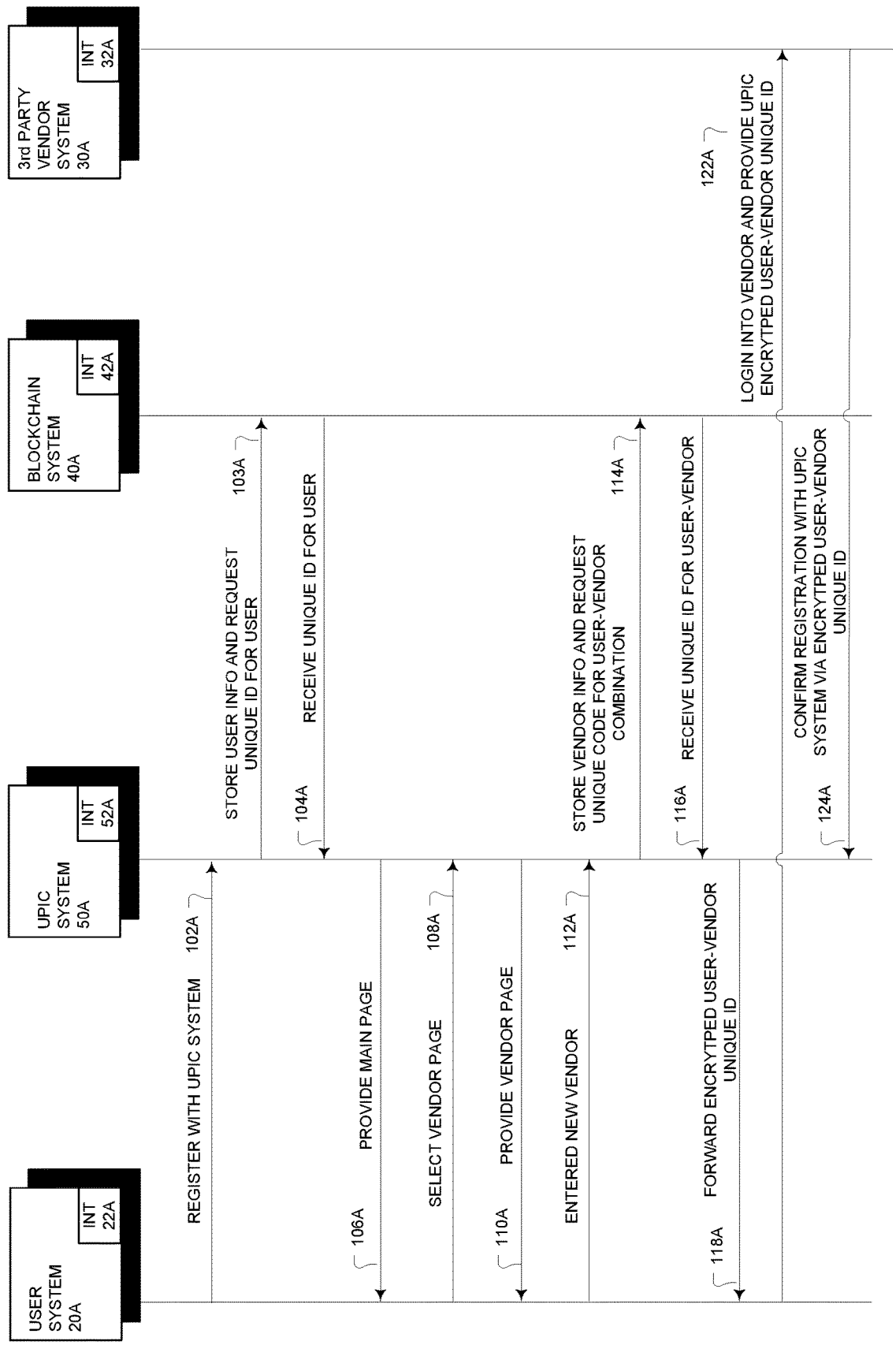
Figure 2B:
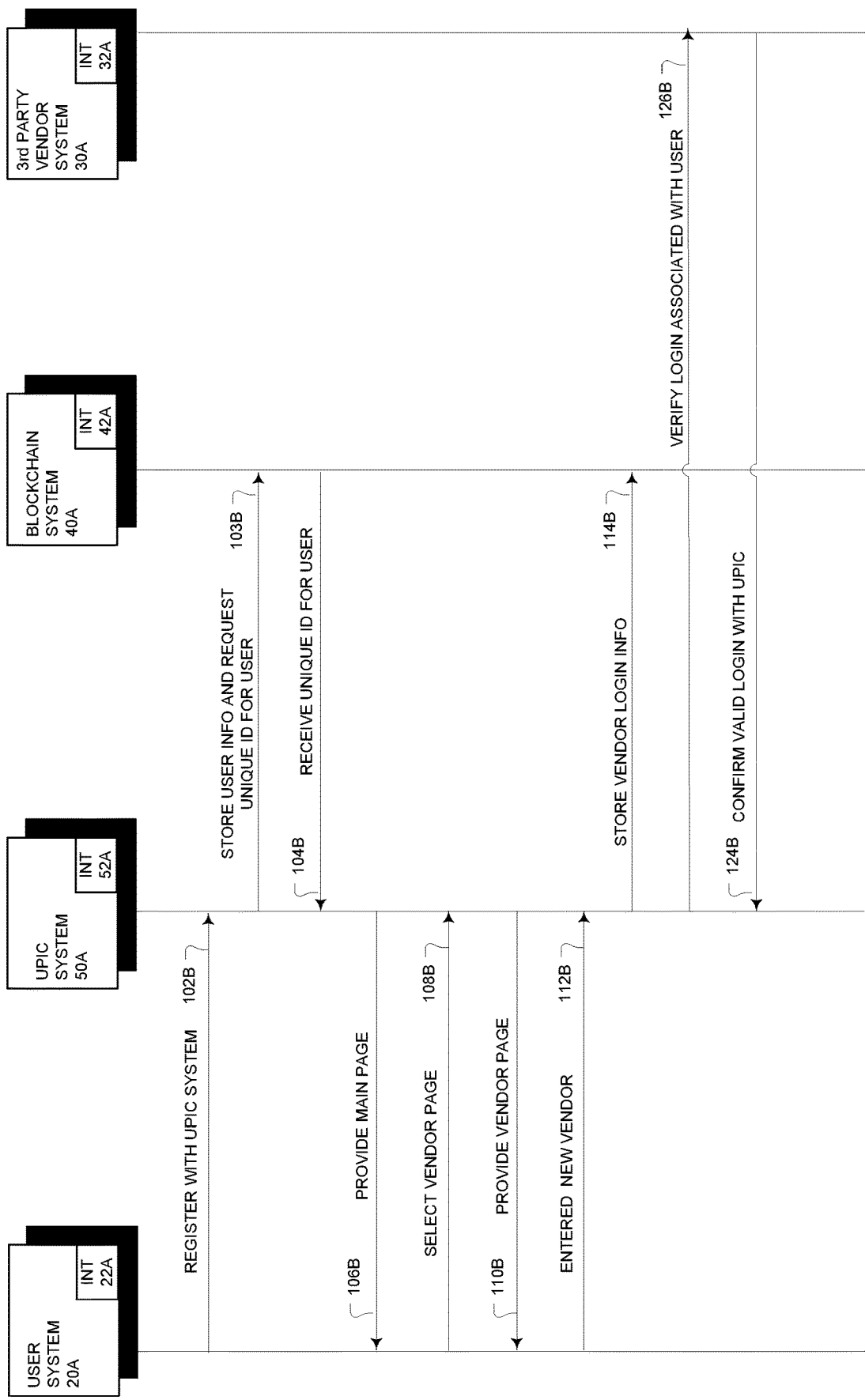

FIGS. 2A-2C are diagrams of communications between a User system 20A, a UPIC system 50A, a blockchain system 40A, and a $3^{rd}$ party vendor system 30A according to various embodiments. To protect confidential User information a User may be required to register with a UPIC 50A initially—communications 102A, 102B. FIG. 5A is a flow diagram illustrating a method 150A of registering a User according to various embodiments. As shown in FIGS. 2A, 2B, and 5A, a UPIC system 50A may receive a registration request (communications 102A, 102B), activity 152A, forward initial User information to a blockchain system for encrypted and distributed storage (communications 103A, 103B), activity 154A. In addition, a UPIC system 50A may request a unique ID for the User from the blockchain system (communications 103A, 103B), activity 154A. In an embodiment, the unique ID for the User may be a blockchain token that uniquely and securely is associated only with the User. The UPIC system 50A may receive and store the generated unique ID or token for the User (communications 104A, 104B) activity 156A.

Figure 3A:
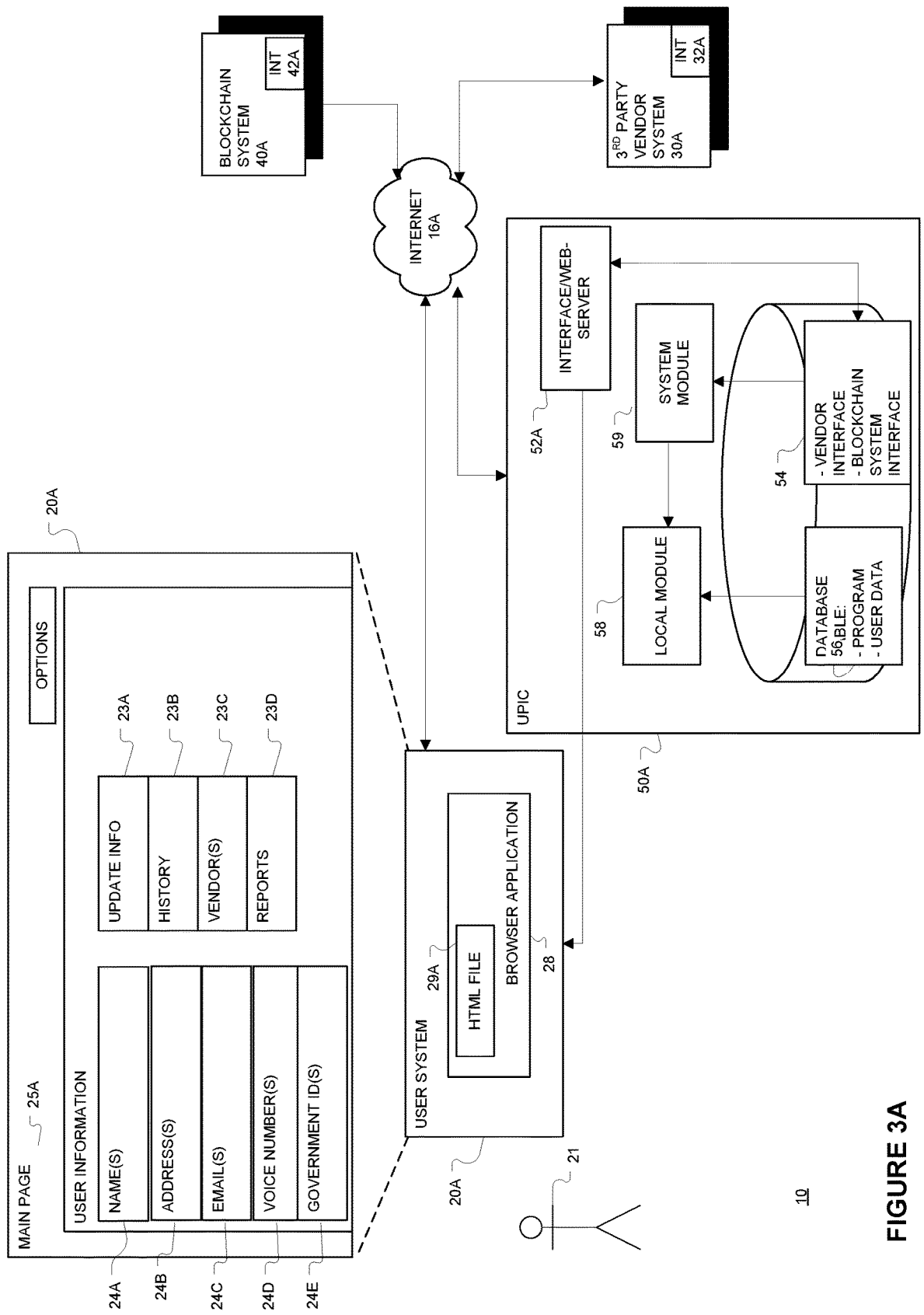
FIG. 3A is a block diagram of UPIC architecture communicating a main page to a User system according to various embodiments.

Once registered, a User may login into a UPIC system 50A thereafter using secured protocols. Once registered or logged into a UPIC system 50A, a UPIC system 50A may generate and provide/forward a main page 106A (communication 106A, 106B) to a User system 20A via a network 16, such as the graphical user interface screen 25A shown in architecture 10 in FIG. 3A. As shown in FIG. 3A, a UPIC system 50A may include a network interface/web-server 52A, Vendor and blockchain tables/databases 54, User tables/databases 56, a local module 58, and a system module 59. The system module 59 may develop requests and processes responses from blockchain systems 40A and Vendor systems 30A. The local module 58 may interface with the User table/database 56 and communicate data between the interface/webserver 52A and the database 56. The User database 56 may include program data for the local module 58, system module 59, and interface/web-server 52A and User data.

The User data may include the unique ID created for the User and User information. The vendor and blockchain tables/databases 54 may include data associated with interfacing with the blockchain systems 40A and Vendor systems 30A in an embodiment. As also shown in FIG. 3A, a main page 25A for a User as generated by a UPIC system 50A may include current User information 24A-24E and selectable activities 23A-23D. The User data may include Name(s) 24A, address(es) (such as work, home, mailing) 24B, email(s) (primary and others) 24C, voice number(s) (primary, mobile, home, work, and others) 24D, and various government and other IDs (such as social security number, health care ID, and others). Other User data may be displayed including date of birth, security questions, and others. In an embodiment, some or all User data may be stored locally in the Database 58. Some or all data may also be stored in a blockchain system 40A. In such an embodiment, the UPIC system 50A may provide the User's unique ID or token to a blockchain system 40A to request/receive the most current User information as stored by the blockchain system 40A. The requested/received User information may be used to populate the main page 25A and update the local database 56.

Figure 3B:
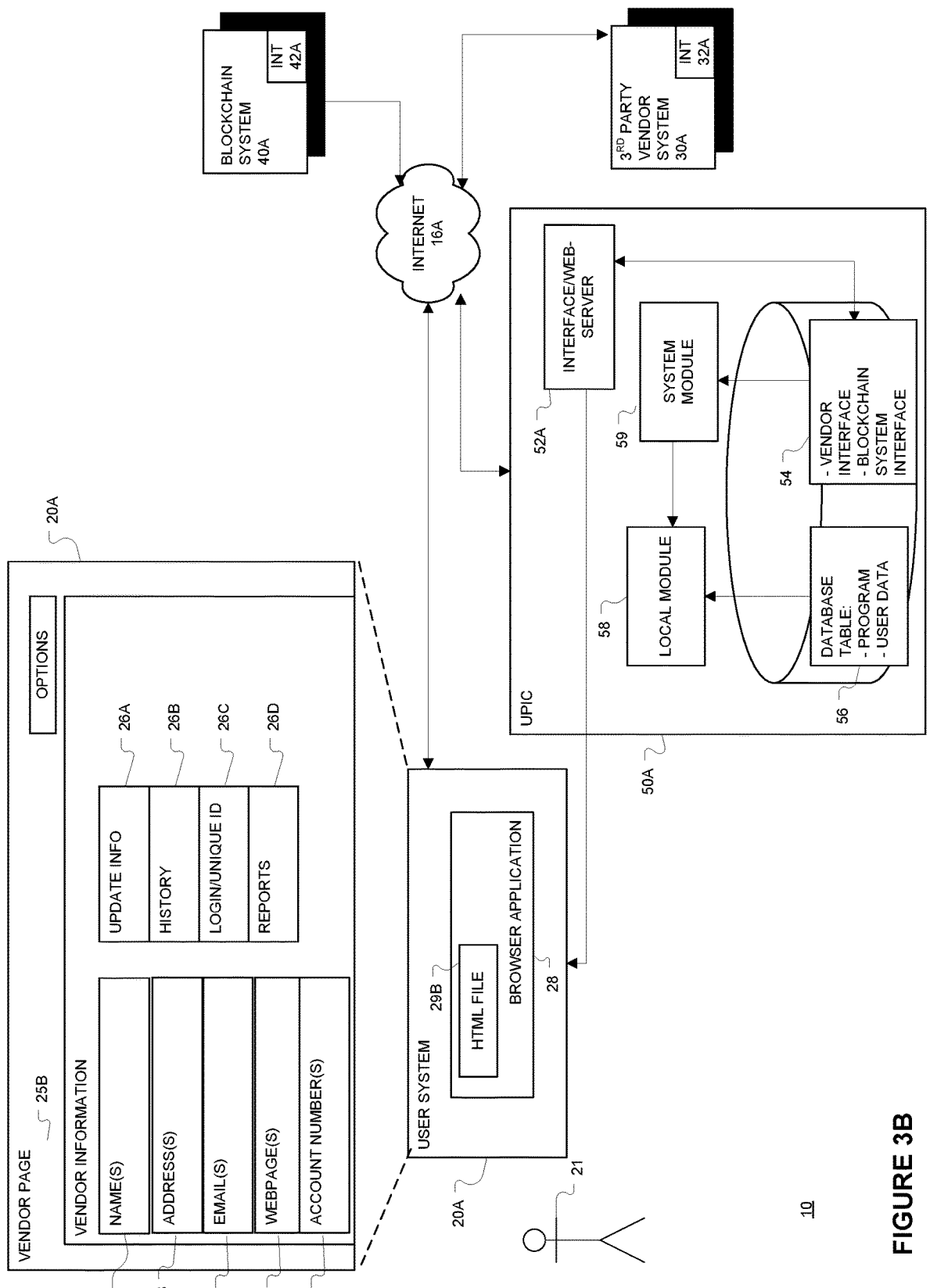
FIG. 3B is a block diagram of UPIC architecture communicating a vendor page to a User system according to various embodiments.

As shown in FIG. 3A, a User via the main page 25A may be able to request to update their information 23A, see update history 23B, manage vendors via a vendor page 23C, and generate various reports 23D. FIG. 3B is a block diagram of UPIC architecture 10 communicating a vendor page 25B to a User system 20A according to various embodiments. As shown in FIG. 3B, the Vendor page 25B may include vendor information 25A-25E and selectable activities 26A-26D. The vendor information may include the vendor name(s) 25A, address(es) 25B, email(s) (primary and others) 25C, webpage(s) 25D including User information update pages, and User account number(s) 25E. The activities may include updating the Vendor information 26A, obtaining Vendor history 26B, providing the User's login information for the vendor 26C, and generating reports specific for the vendor 26D.

In an embodiment, vendor data may be stored locally in database 54 and in a blockchain system 40A specific for the User, or combination of both. In an embodiment, a UPIC system 50A may employ the algorithm 150B shown in FIG. 5B and communications 108B-124B when a User creates adds a Vendor to their UPIC system 50A profile. As shown in FIGS. 2A and 2B, when a User selects the vendor activity 23C from the main page 25A (communication 108A, 108B), the UPIC system 50A provide the vendor page 25B shown in FIG. 3B (communication 110A, 110B).

In an embodiment, when a User provides or enters a new Vendor for them (communication 112A) activity 152B, a UPIC system 50A may forward the Vendor information for storage in a blockchain system 40A and request a unique ID or token for the User-Vendor combination (communication 114A) activity 154B. Then the UPIC system 50A upon receiving the User-Vendor unique ID or token (communication 116A, 156B), may create and forward a one-time code based on the token, the actual token in an encrypted format, or a link to the token to a User system 20A (communication 118A activity 158B). A User 21 via a User system 20A may enter the forwarded one-time code based on the token, the actual token in an encrypted format, or a link to the token into a special section of a Vendor page of a Vendor system 30A once the User logs into the Vendor system 30A (communication 122A). In an embodiment, Vendors may enable a User 21 to create links between themselves and the UPIC system 50A in the Vendor system 30A for the User 21. A Vendor may forward the one-time code based on the token, the actual token in an encrypted format, or a link to the token to the UPIC system 50A to confirm the linkage between the systems 30A, 50A for a particular User 21 (communication 124A, activities 162B, 164B).

Based on the confirmed linkage, a UPIC system 50A may be able to send updated User information to a Vendor system 30A without User intervention. In addition, a UPIC system 50A may be able to poll a Vendor system 30A to retrieve and verify current User 21 information or related account information for reports. In an embodiment, a User may need to periodically confirm the linkage and the UPIC system 50A may provide a new code to do so. In addition, a User via the UPIC system 50A or a Vendor system 30A may be able to sever or confirm the linkage.

In another embodiment, when a User provides or enters a new Vendor for them (communication 112B) activity 152C, a UPIC system 50A may forward the Vendor information for storage in a blockchain system (communication 114B) activity 154C. Then the UPIC system 50A may store the User's login information for the Vendor activity 158B. A UPIC system 50A may then use the User login information to create a confirmed relationship via a special section of a Vendor page of a Vendor system 30A (communication 126B, activity 158C). In an embodiment, Vendors may enable a UPIC system 50A to create links between a User 21 and the UPIC system 50A in the Vendor system 30A via the User' login one-time. The Vendor may confirm the linkage between the systems 30A, 50A for a particular User 21 (communication 124B, activities 162C, 164C).

Based on the confirmed linkage via the User login, a UPIC system 50A may be able to send updated User information to a Vendor system 30A without User intervention. In addition, a UPIC system 50A may be able to poll a Vendor system 30A to retrieve and verify current User 21 information or related account information for reports. In an embodiment, a User may need to periodically confirm the linkage and the UPIC system 50A may provide a new code to do so. In addition, a User via the UPIC system 50A or a Vendor system 30A may be able to sever or confirm the linkage.

Figure 3C:
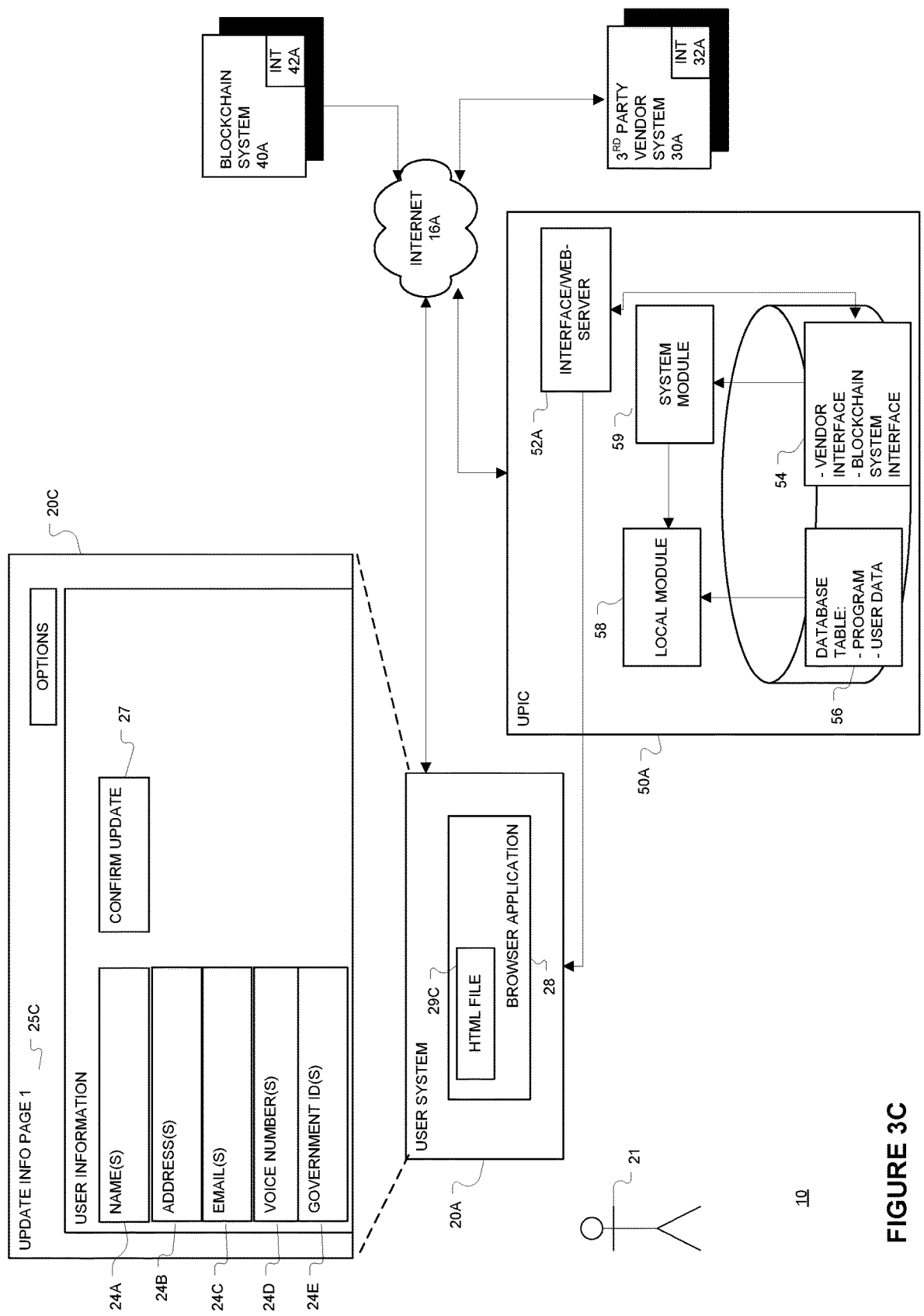
FIG. 3C is a block diagram of UPIC architecture communicating a user information update page one to a User system according to various embodiments.
Figure 3D:
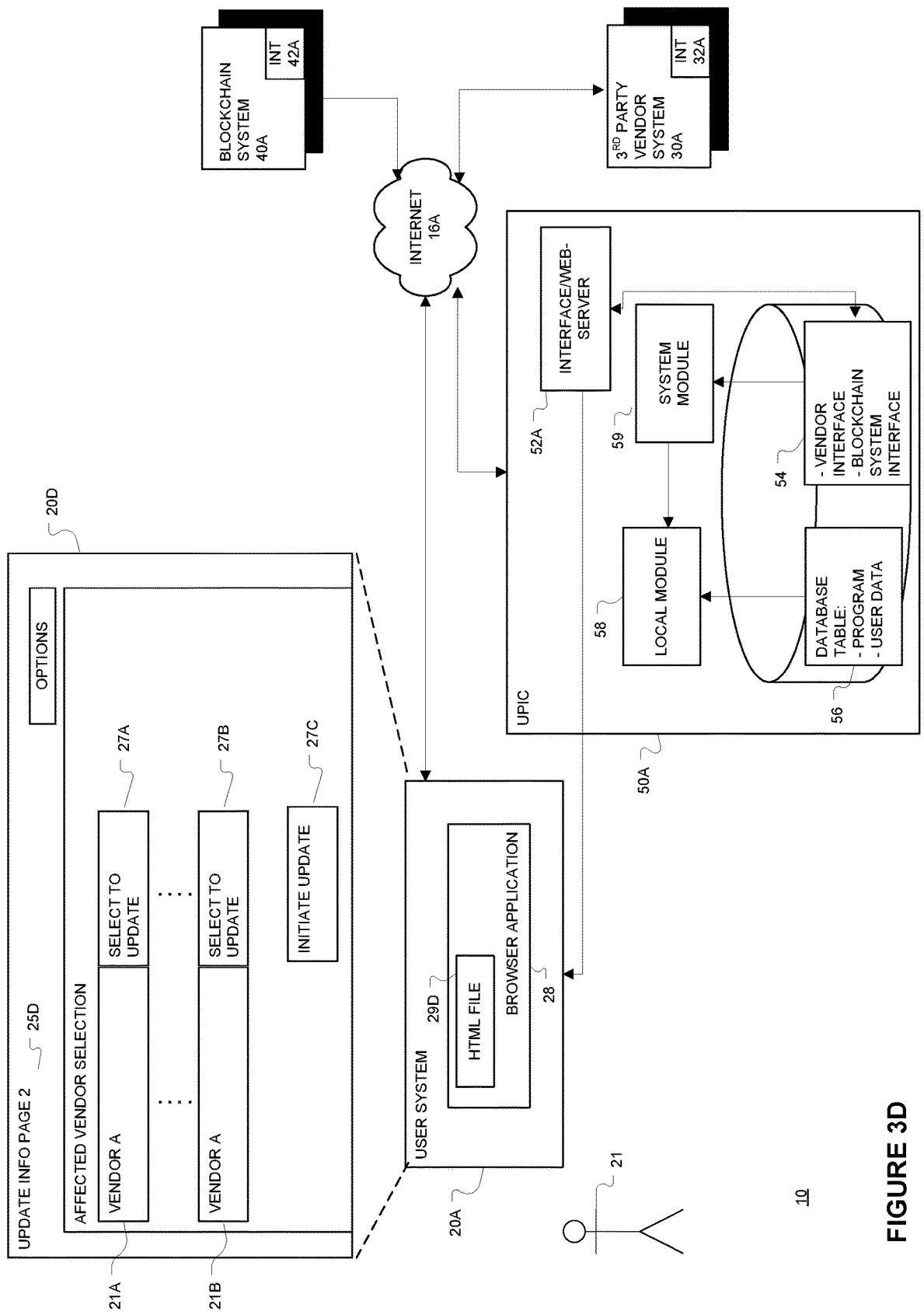
FIG. 3D is a block diagram of UPIC architecture communicating a user information update page two to a User system according to various embodiments.

As shown in FIG. 3A another activity that a User 21 may perform is updating their personal information. As shown in FIGS. 3C and 3D, communications 104C-126C of FIG. 2C, a User 21 may be able to update their information and then select one or more Vendors to receive the updates. In embodiment, when a User 21 selects to update their information from the main page 25A (communications 104C, 106C, 108C), then architecture 10 shown in FIG. 3C may display update information page 1 25C. In an embodiment, a UPIC system 50A may request and receive the User's current information from a blockchain system 40A (communications 112C, 114C) or retrieve the information from a local database 56, or combination of both. Once the User updates information and confirms the update via selection 27 on page 25C, a UPIC system 50A may store the updated User information locally and in a blockchain system 40A. The updates may be stored as new entries in the blockchain system 40A so an audit trail of changes may be retrievable.

Then a UPIC system 50A may determine, which if any Vendors may be affected by the update of User information. For example, the updated information may not be stored by a particular Vendor and thus not affect their information about the User 21. The UPIC system 50A may provide an effected vendor update selection page (shown in architecture 10 in FIG. 3D) (communication 124C). A User 21 may then confirm or not confirm to update certain or all effected Vendors 21A-21B via selections 27A-27B and selection 27C (communication 126C). Then a UPIC system 50A via the confirmed links for the User and the selected Vendors may update the User information for all selected Vendors (communications 128C, 129C). In an embodiment, a UPIC system 50A may provide a code that confirms the linkage between the UPIC 50A, vendor system 30A, and User 21

FIG. 4 is a block diagram of a UPIC system 50A modules according to various embodiments. As shown in FIG. 4, a UPIC system 50A may include a registration/login module 72A, a vendor system module 74A, a report generation module 76A, a hyper text markup language (HTML) module 78A, a security module 82A, a cryptography or block chain module 86A, a local data backup module 84A, and a data communication module 88A. The registration/login module 72A along with the blockchain module may be used to request and obtain a unique ID or token for a new User 21 of the UPIC system 50A and enable future logins for the user.

The vendor system module 74A along with the blockchain module 86A (in an embodiment) may be used in part to create a unique linkage between the User 21, UPIC system 50A, and the Vendor system 30A as described above. The report generation module 76A may be able to generate various reports based on Vendor and User information including current User information and Vendor related information, which varies by the vendor. The reports may include monthly expenditures reports and others. The HTML, module 78A may generate the various pages shown in FIGS. 3A-3D. The security module 82A may work with the other modules to provide required levels of security to communicate with a User system 20A, Vendor system 30A, and blockchain system 40A. The local data backup module may continuously or periodically back up data stored in the databases 54, 56.

In an embodiment, the databases 54, 56 may employ Greenplum (www.greenplum.com), Hadoop (hadoop.apache.org) HTTP Filer Server (HFS), PostgreSQL (www.postgresql.org) software, and other software and hardware to maintain the databases 52, 56. The system 50 may also store data on one or more cloud clusters or distributed systems. The data communication module may enable a UPIC system 50A to communicate over various networks using different protocols.

Figure 6:
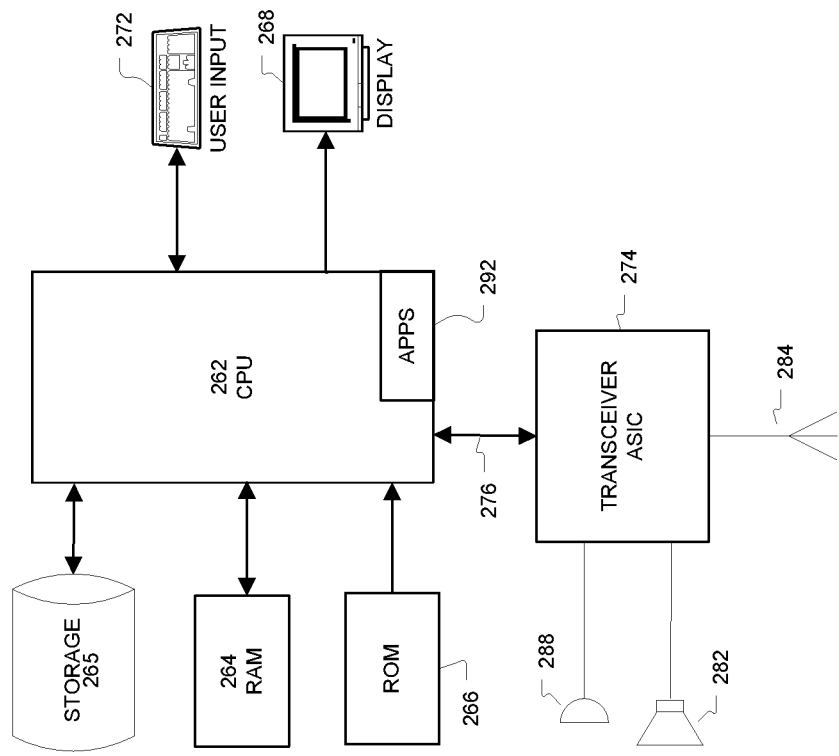
FIG. 6 is a block diagram of an article according to various embodiments.

A device 260 is shown in FIG. 6 that may be used in various embodiments as a User system 20A. The device 260 may include a central processing unit (CPU) 262, a random-access memory (RANI) 264, a read only memory (ROM") 266, a display 268, a user input device 272, a transceiver application specific integrated circuit (ASIC) 274, a microphone 288, a speaker 282, a storage unit 265, and an antenna 284. The CPU 262 may include an application module 292 including a browser application module. The RAM 264 may store UPIC system 50A provided content including HTTP data.

In an embodiment, the applications 292 may be a separate module. The application module 292 may process messages, displays, or pages from and generate messages, display, responses, or pages for the UPIC system 50A web-server 52. The storage 265 may store data provided by the UPIC system 50A web-server 52. The storage device 265 may comprise any convenient form of data storage and may be used to store temporary program information, queues, databases, and overhead information.

The ROM 266 may be coupled to the CPU 262 and may store the program instructions to be executed by the CPU 262, and the application module 292. The RAM 264 may be coupled to the CPU 262 and may store temporary program data, and overhead information. The user input device 272 may comprise an input device such as a keypad, touch screen, track ball or other similar input device that allows the user to navigate through menus, displays in order to operate the device 260. The display 268 may be an output device such as a CRT, LCD, touch screen, or other similar screen display that enables the user to read, view, or hear received messages, displays, or pages from the UPIC system 50A web-server 52.

A microphone 288 and a speaker 282 may be incorporated into the device 260. The microphone 288 and speaker 282 may also be separated from the device 260. Received data may be transmitted to the CPU 262 via a bus 276 where the data may include messages, displays, or pages received, messages, displays, or pages to be transmitted, or protocol information. The transceiver ASIC 274 may include an instruction set necessary to communicate messages, displays, or pages in architecture 10. The ASIC 274 may be coupled to the antenna 284 to communicate wireless messages, displays, or pages within the architecture 10. When a message is received by the transceiver ASIC 274, its corresponding data may be transferred to the CPU 262 via the bus 276. The data can include wireless protocol, overhead information, and pages and displays to be processed by the device 260 in accordance with the methods described herein.

Figure 7:
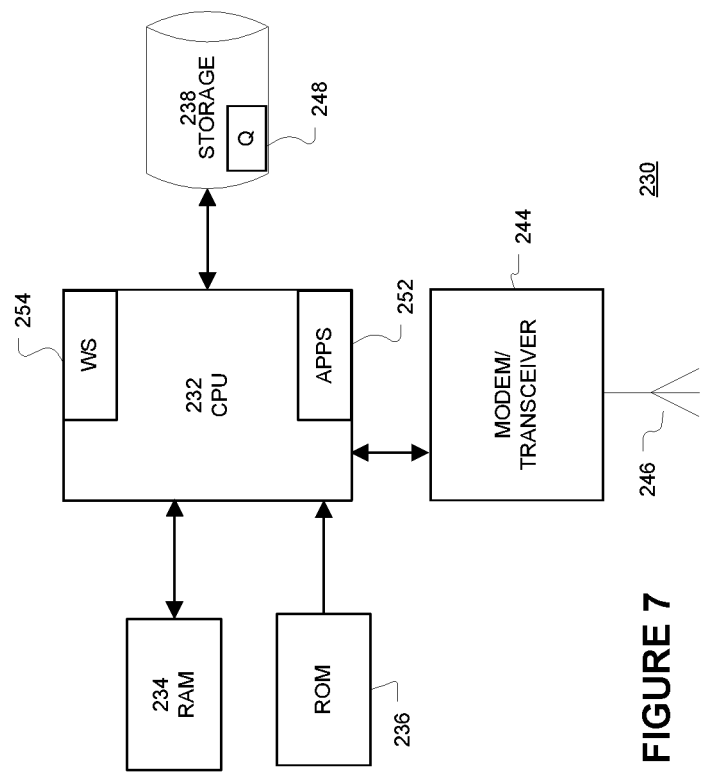
FIG. 7 is a block diagram of an article according to various embodiments.

FIG. 7 illustrates a block diagram of a device 230 that may be employed as a UPIC system 50A-B, blockchain system 40A-B, and vendor system 30A-B in various embodiments. The device 230 may include a CPU 232, a RAM 234, a ROM 236, a storage unit 238, a modem/transceiver 244, and an antenna 246. The CPU 232 may include a web-server 254 and application module 252. The RAM 234 may include a queue or database 248 where the database 248 may be used to store information including User and Vendor information, related data, and statistics. The storage 238 may also include a queue or database 256 where the database 256 may be used to store User and Vendor information. In an embodiment, the web-server 254 and the application module 252 may be separate elements. In an embodiment, the web-server 254 may generate content for web-pages or displays to be forwarded to a User system 20A.

The modem/transceiver 244 may couple, in a well-known manner, the device 230 to the network 16 to enable communication with a User system 20A or other systems 30A, 40A, 50A. In an embodiment, the modem/transceiver 244 may be a wireless modem or other communication device that may enable communication with a a User system 20A or other systems 30A, 40A, 50A. The CPU 232 via the web-server 254 may direct communication between modem 244 and a a User system 20A or other systems 30A, 40A, 50A.

The ROM 236 may store program instructions to be executed by the CPU 232, web-server 254, or application module 252. The RAM 234 may be used to store temporary program information, queues, databases, and overhead information. The storage device 238 may comprise any convenient form of data storage and may be used to store temporary program information, queues, databases, and overhead information.

Any of the components previously described can be implemented in a number of ways, including embodiments in software. Any of the components previously described can be implemented in a number of ways, including embodiments in software. Thus, the CPU 232, web-server 254, application module 252, modem/transceiver 244, antenna 246, storage 238, RAM 234, ROM 236, database 248, database 256, CPU 262, application module 292, transceiver ASIC 274, antenna 284, microphone 288, speaker 282, ROM 266, RAM 264, database 267, user input 272, display 268, UPIC system 50A, blockchain system 40A, vendor system 30A, and, User system 20A, may all be characterized as "modules" herein.

The modules may include hardware circuitry, single or multi-processor circuits, memory circuits, software program modules and objects, firmware, and combinations thereof, as desired by the architect of the architecture 10 and as appropriate for particular implementations of various embodiments.

The apparatus and systems of various embodiments may be useful in applications other than a sales architecture configuration. They are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., mp3 players), vehicles, medical devices (e.g., heart monitor, blood pressure monitor, etc.) and others. Some embodiments may include a number of methods.

It may be possible to execute the activities described herein in an order other than the order described. Various activities described with respect to the methods identified herein can be executed in repetitive, serial, or parallel fashion.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A computer-implemented method of enabling a plurality of users to update their personal information for a plurality of vendor electronic platforms, the method comprising:
    generating a unique token for each of the plurality of Users;
    receiving from a User of the plurality of Users via a user system vendor specific login information for each of the plurality of vendor electronic platforms;
    forming a User/vendor specific unique code for each the plurality of electronic platforms based on the User's unique token and user system vendor specific login information for each of the plurality of vendor electronic platforms;
    storing the User's vendor specific login information for the plurality of vendor electronic platforms based on the User's unique token;
    receiving updated personal information for the User of the plurality of Users via a User system; and
    sending updated personal information for the User of the plurality of Users and the User/vendor specific unique code for each of the plurality of vendor electronic platforms to each of the plurality of vendor electronic platforms to enable each vendor platform of the plurality of vendor electronic platforms to update the personal information for the User.

2. The computer-implemented method of claim 1, including encrypting the the User's vendor specific login information for each of the plurality of vendor electronic platforms.

3. The computer-implemented method of claim 2, further including storing the User's vendor specific login information for each of the plurality of vendor electronic platforms in block chains.

4. The computer-implemented method of claim 2, further including verifying the validity of the User's vendor specific login information for each of the plurality of vendor platforms prior to forming the unique code for each the plurality of electronic platforms.

5. The computer-implemented method of claim 1, wherein at least one of the plurality of the vendor electronic platforms is a banking platform.

6. The computer-implemented method of claim 1, wherein at least one of the plurality of the vendor electronic platforms is a public utility provider service platform.

7. The computer-implemented method of claim 1, further including receiving confirmation of updated personal information for the User from each of the plurality of vendor electronic platforms.

8. The computer-implemented method of claim 4, wherein each User/vendor specific unique code is specific for User and one of the plurality of vendor electronic platforms.

9. The computer-implemented method of claim 8, including storing the updated personal information for the User of each of the plurality of vendor electronic platforms in block chains.

10. The computer-implemented method of claim 8, wherein the formed User/vendor specific unique code for each of the plurality of vendor electronic platforms represents a confirmed relationship between the User and each of the plurality of vendor electronic platforms.

11. The computer-implemented method of claim 10, wherein at least one of the plurality of the vendor electronic platforms is a banking platform.

12. The computer-implemented method of claim 10, wherein at least one of the plurality of the vendor electronic platforms is a public utility provider platform.

13. The computer-implemented method of claim 8, further including receiving confirmation of updated personal information for the User from each of the plurality of vendor electronic platforms.

14. The computer-implemented method of claim 13, wherein the formed User/vendor specific unique code for each of the plurality of vendor electronic platforms represents an encrypted linkage between the User and each of the plurality of vendor electronic platforms.

15. The computer-implemented method of claim 14, further including storing the updated personal information for the User of each of the plurality of vendor electronic platforms in block chains.

16. The computer-implemented method of claim 8, further including storing the User's vendor specific login information for each of the plurality of vendor electronic platforms in block chains.

17. The computer-implemented method of claim 16, wherein at least one of the plurality of the vendor electronic platforms is a banking platform.

18. The computer-implemented method of claim 17, wherein at least one of the plurality of the vendor electronic provider platforms is a public utility provider platform.

* * * * *